(12) United States Patent
Torr

(10) Patent No.: US 8,263,228 B2
(45) Date of Patent: Sep. 11, 2012

(54) VEHICLE GLAZING

(75) Inventor: Ashley Carl Torr, Ormskirk (GB)

(73) Assignee: Pilkington Automotive Limited, St. Helens, Merseyside (GB)

( * ) Notice: Subject to any disclaimer, the term of this patent is extended or adjusted under 35 U.S.C. 154(b) by 311 days.

(21) Appl. No.: 12/279,314

(22) PCT Filed: Feb. 6, 2007

(86) PCT No.: PCT/GB2007/050051
§ 371 (c)(1),
(2), (4) Date: Sep. 10, 2008

(87) PCT Pub. No.: WO2007/093823
PCT Pub. Date: Aug. 23, 2007

(65) Prior Publication Data
US 2010/0221461 A1 Sep. 2, 2010

(30) Foreign Application Priority Data
Feb. 14, 2006 (GB) .................................. 0602933.4

(51) Int. Cl.
*B32B 17/00* (2006.01)

(52) U.S. Cl. .......... 428/432; 428/34; 428/428; 428/689; 428/697; 428/701; 428/702

(58) Field of Classification Search ............... 428/34, 428/428, 432, 689, 697, 699, 701, 702
See application file for complete search history.

(56) References Cited

U.S. PATENT DOCUMENTS

| | | | |
|---|---|---|---|
| 4,338,000 A | | 7/1982 | Kamimori et al. |
| 5,792,559 A | * | 8/1998 | Heithoff et al. ............... 428/437 |
| 5,854,708 A | | 12/1998 | Komatsu et al. |
| 6,055,088 A | | 4/2000 | Fix et al. |
| 6,068,914 A | | 5/2000 | Boire et al. |
| 6,071,623 A | | 6/2000 | Sugawara et al. |
| 6,326,079 B1 | | 12/2001 | Philippe et al. |
| 6,337,129 B1 | | 1/2002 | Watanabe et al. |
| 6,582,839 B1 | | 6/2003 | Yamamoto et al. |
| 6,746,775 B1 | * | 6/2004 | Boire et al. .................. 428/432 |
| 6,924,037 B1 | | 8/2005 | Joret et al. |

(Continued)

FOREIGN PATENT DOCUMENTS

DE 37 18 580 A1 12/1988

(Continued)

OTHER PUBLICATIONS

International Search Report (PCT/ISA/210), 2007.

(Continued)

*Primary Examiner* — Jennifer McNeil
*Assistant Examiner* — Lauren Robinson
(74) *Attorney, Agent, or Firm* — Buchanan Ingersoll & Rooney PC

(57) ABSTRACT

A vehicle glazing comprising two panes of glazing material spaced apart from one another, a self-cleaning coating extending over the outermost surface of the glazing, and having a solar control function. The solar control function may result from the presence of a solar control coating or at least one pane of glazing material being body-tinted. The glazing may be a laminate or a double glazing unit and it may also include a functional layer, such as a liquid crystal film or a layer of light emitting diodes.

18 Claims, 2 Drawing Sheets

U.S. PATENT DOCUMENTS

| | | |
|---|---|---|
| 2002/0016250 A1 | 2/2002 | Hayakawa et al. |
| 2002/0182421 A1* | 12/2002 | Tixhon .................... 428/432 |
| 2003/0064231 A1 | 4/2003 | Hurst et al. |
| 2004/0043260 A1 | 3/2004 | Nadaud et al. |
| 2005/0252108 A1 | 11/2005 | Sanderson et al. |
| 2006/0014050 A1 | 1/2006 | Gueneau et al. |
| 2007/0082219 A1* | 4/2007 | Fleury et al. ............... 428/656 |
| 2007/0128449 A1* | 6/2007 | Taylor et al. ............... 428/432 |

FOREIGN PATENT DOCUMENTS

| | | |
|---|---|---|
| DE | 102 46 840 A1 | 4/2004 |
| DE | 102 46 841 A1 | 4/2004 |
| EP | 0 492 785 A1 | 7/1992 |
| EP | 0 839 644 A1 | 5/1998 |
| EP | 0 839 771 A1 | 5/1998 |
| EP | 1 291 331 A2 | 3/2003 |
| EP | 1 437 215 A1 | 7/2004 |
| GB | 1160294 | 8/1969 |
| GB | 2 403 731 A | 1/2005 |
| JP | 9-227162 A | 9/1997 |
| JP | 10-036144 A | 2/1998 |
| JP | 10-045431 A | 2/1998 |
| JP | 10-045435 A | 2/1998 |
| JP | 10-130037 A | 5/1998 |
| JP | 10-146251 A | 6/1998 |
| JP | 10-147770 A | 6/1998 |
| JP | 10-147771 A | 6/1998 |
| JP | 11-140434 A | 5/1999 |
| JP | 11-228183 A | 8/1999 |
| JP | 2000-153578 A | 6/2000 |
| JP | 2000-319641 A | 11/2000 |
| JP | 2001-137318 A | 5/2001 |
| JP | 2001-180980 A | 7/2001 |
| JP | 2002-211956 A | 7/2002 |
| JP | 2002-273237 A | 9/2002 |
| JP | 2003-027000 A | 1/2003 |
| JP | 2003-181295 A | 7/2003 |
| WO | WO 2004/085701 A1 | 10/2004 |

OTHER PUBLICATIONS

International Preliminary Report on Patentability (PCT/IPEA/409), 2008.

Search Report issued in priority GB Patent Application No. GB0602933.4, Jun. 9, 2006, The Patent Office, South Wales, UK.

* cited by examiner

VEHICLE GLAZING

The present invention relates to vehicle glazings, in particular to self-cleaning vehicle glazings.

Vehicles, for example cars and buses, have a number of window openings in their bodywork into which glazings may be fitted; the glazings include windscreens, rear window glazings, side window glazings and roof glazings. In a typical car, the windscreen is a laminated glazing (i.e. having two plies of glazing material joined together by a ply of interlayer material extending between them) for safety reasons, and the remainder of the glazings are usually toughened glass (although laminated side window glazings and roof glazings are becoming increasingly popular in vehicles). In a typical bus, again the windscreen is a laminated glazing, the rear window glazing is usually toughened glass, and the side window and roof glazings may be double glazing units (i.e. having two plies of glazing material and a sealed airspace between them).

In addition to providing a self-cleaning coating on glazings intended for use in buildings and the like, it is known to provide a self-cleaning coating on a vehicle glazing. It would however be desirable, especially in light of current demands from vehicle manufacturers, to be able to provide such a self-cleaning vehicle glazing with additional functionality to enhance the usefulness of the glazing, but without compromising the effect of the self-cleaning coating, and without significantly increasing the cost of producing such a glazing or the complexity of the production process.

Accordingly, the present invention provides a vehicle glazing comprising: two panes of glazing material spaced apart from one another, and a self-cleaning coating extending over the outermost surface of the glazing, wherein the glazing is provided with a solar control function.

A vehicle glazing comprising both a self-cleaning coating and a solar control function indeed possesses the desired multiple functionality that is able to provide additional advantages to the owners and occupants of a vehicle into which such a glazing may be installed. Thus in addition to benefiting from the self-cleaning aspect of the glazing, whereby the occupants of the vehicle may continually have substantially cleaner windows to look through (compared to windows not having a self-cleaning coating) and the person who washes the vehicle having windows that are easier to clean, the amount of solar heat (as infrared radiation) entering the vehicle may be appreciably reduced, thereby creating a more comfortable environment inside the vehicle for its occupants.

By defining that the self-cleaning coating extends over the outermost surface of the glazing, it is meant that the coating is on surface one of the glazing. In conventional vehicle glazing surface numbering terminology, the surfaces of each of the panes of a glazing are consecutively numbered inwardly from the surface that contacts the environment on the exterior of a vehicle to the surface that contacts the environment inside the vehicle. Thus for two panes of glazing material, the surfaces are numbered one to four from the outermost to the innermost. The two panes of glazing material may be spaced apart from one another by a further ply of material which extends between the two panes, or they may be spaced apart such that there is a gaseous layer (for example a sealed airspace) between them, as will be described in more detail later.

As discussed in this specification a "self-cleaning" coating is one which, subsequent to being contacted with water such as rainwater or water sprayed from a source such as a hosepipe, exhibits a reduction in the amount of dirt or other contaminants present on the exposed surface of the coating as compared to a pane of glazing material that is not provided with a self-cleaning coating. In addition to the advantages described above, the vehicle occupants may also benefit from increased visibility through clearer windows which result from the manner in which water contacts and runs off the coating. Further details of this aspect and of self-cleaning coatings generally will be discussed later in the specification.

Preferably the glazing further comprises a functional layer that extends between the two panes of glazing material. The self-cleaning coating may possess solar control properties, in which case the functionality of the functional layer would be in addition to this, and would provide yet further benefit to an occupant of a vehicle into which such a glazing may be fitted. However, it may be that the self-cleaning coating does not possess any (or any appreciable) solar control properties, and so the functional layer alone may provide the glazing with its solar control function. If the latter is the case, the functional layer may comprise a ply of polymeric material that is provided on one of its surfaces with a solar control coating. The ply of polymeric material may be for example a ply of polyethylene terephthalate ("PET").

Typically, a solar control coating may include either a) at least one silver-based layer or b) at least one tin-based layer. Accordingly the solar control coating may comprise one or more layers of zinc oxide, titanium dioxide and/or silver. Alternatively the solar control coating may comprise fluorine-doped tin oxide. The coating may also include one or more layers of silicon nitride, aluminium nitride and/or nichrome (NiCr). The solar control coating may include a single layer of a metal or other metal oxide. Oxides of metals such as tin, indium, tungsten and molybdenum may be comprised in the single layer of metal oxide. The coating may further comprise a dopant, for example fluorine, chlorine, antimony, tin, aluminium, tantalum, niobium, indium or gallium, so that a coating such as or tin-doped indium oxide may result.

Alternatively, the solar control coating may comprise a multilayer coating stack which normally includes at least one metal layer or metal oxide layer and at least one dielectric layer. The multilayer stack structure may be repeated to further enhance the solar control function of the coating. Amongst other similar metals, silver, gold, copper, nickel and chromium may be used as the metal layer in a multilayer stack; indium oxide, antimony oxide or the like may be used as the metal oxide layer. Coatings comprising one or two layers of silver interleaved between layers of a dielectric such as an oxide of silicon, aluminium, titanium, vanadium, tin or zinc are typical multilayer stacks. Generally the one or more layers from which the coating is formed are of the order of tens of nanometres in thickness. A number of solar control coatings are known in the art, any of which may be used in accordance with the invention.

Solar control is one of the functions that the functional layer may provide to the glazing. In addition to, or as an alternative to, having solar control properties the functional layer may comprise an electrical device. An electrical device is a device that requires electrical energy to perform its function and has dimensions that make it suitable for inclusion in a vehicle glazing, for example a means of integrated lighting such as one or more light emitting diodes (possibly organic LEDs), a temperature sensor, a light sensor, a fingerprint sensor, a capacitive switch/sensor, an optical switch and the like. One or more such devices may be comprised in the glazing. The electrical device may be provided on an electrically conductive substrate, through which the electrical power that it needs in order to function may be supplied. The electrically conductive substrate may be one of two types: i) it may be a coating (preferably an electrically conductive solar control coating) which has conductive tracks suitably formed in it (for example, by laser deletion of the coating), or ii) it may be a flexible circuit board on which conductive tracks are provided. In both cases, the substrate usually also forms part of the functional layer. However the coating may alternatively be provided on one of the panes of glazing material.

Further functionality that the functional layer may possess (in addition to, or as an alternative to, one or both of the aspects previously described herein) relates to the way in which light is transmitted by the glazing. As such, the functional layer may comprise a visible light attenuation material for dispersing and attenuating light transmitted through the glazing. The light referred to may be sunlight, moonlight, light from a streetlamp, etc. Attenuation and dispersion of light is especially useful if the functional layer also includes an electrical device in the form of one or more light emitting diodes. This is because light emitting diodes are discrete point sources of light, and a light attenuation material may be included and appropriately positioned in the glazing construct to scatter and reduce the amount of light emitted by the one or more diodes.

Preferably the visible light attenuation material is selected from the group of materials consisting of a liquid crystal film, an electrochromic layer and a suspended particle device ("SPD"). A liquid crystal film may diffuse visible light passing through it as well as attenuating it. A liquid crystal film may be electrically switchable between a clear state (resulting from a voltage being applied to the film) and an opaque state (having no voltage applied). The degree to which visible light passing through a liquid crystal film is attenuated and diffused may be controlled by regulation of the voltage applied to the film. Advantageously, the liquid crystal film may be divided into zones, and each zone may be independently switchable. An electrochromic material can similarly be switched between a clear state and a darkened state when a voltage is passed through it, as is known in the art. An SPD may be electrically switchable between a darkened state (having no voltage applied to it) and a state of increased visible light transmittance (resulting from an AC voltage being applied to the device), again as is known in the art. Any known liquid crystal film material, electrochromic material or SPD that is suitable for inclusion in a vehicle glazing may be used.

Having now considered some possibilities for the functional layer, referring again to the solar control function of the glazing, it may be that at least one of the panes of glazing material is a body-tinted glass, the composition of which may include one or more of the following colourants: iron oxide, cobalt oxide, selenium, chromium oxide, titanium oxide, manganese oxide, copper oxide, vanadium oxide, nickel oxide. If iron oxide (as total iron expressed as $Fe_2O_3$) is used as a colourant it is preferably included in an amount from 0.01 to 3.0% by weight of the glass, further preferably from 0.1 to 2.0% by weight and most preferably from 0.5 to 1.5 by weight. The more total iron that is present in the glass, especially iron in the ferrous state ($Fe^{2+}$), the more infrared radiation may be absorbed by the glass.

Both panes of glazing material may be panes of glass, and if only one pane is body-tinted, the other pane may be clear. It is also possible that both panes may be clear glass, or both panes may be body-tinted. One or both panes may be toughened glass. Furthermore, a pane of glazing material may instead be made from a plastics material, for example polycarbonate. The panes of glazing material may be flat or they may be curved. Each pane may be between 0.5 and 25 mm in thickness, preferably between 1 and 10 mm, further preferably between 1 and 5 mm. The overall thickness of the glazing may therefore be between 1.5 and 100 mm, preferably between 2 and 50 mm, further preferably between 2.5 and 20 mm and most preferably between 2.5 and 10 mm. The thinner the panes of glazing material, the lighter in weight the glazing as a whole will be, which is advantageous for vehicle manufacturers and the environment generally because a vehicle equipped with lighter-weight glazings is usually more fuel efficient as a result of its overall weight reduction.

It is moreover possible that the solar control function of the glazing may, additionally or alternatively to the options presented above, be fulfilled by providing a solar control coating (as defined above) on an inner surface of at least one of the panes of glazing material. By an "inner surface" is meant a non-exposed surface within the glazing, i.e. on surface 2 or 3 of the glazing.

Referring again now to the self-cleaning coating on the outermost surface of the glazing a self-cleaning coating may be hydrophilic, hydrophobic or super-hydrophobic (currently described as having a contact angle less than around 30°, greater than around 80° and greater than around 120° respectively) in nature. When water contacts a hydrophilic coating, it has a tendency to spread over it, effectively forming a sheet. When encouraged to run off the coating (for example under the influence of gravity), the water remains sheet-like. When water contacts a hydrophobic coating, it has a tendency to form discrete droplets on the coating, which run off it when encouraged to do so. Such water behaviour may lead to clearer windows, as discussed earlier. To be able to draw on currently developed technology for building glass though, hydrophilic coatings are presently preferred. The coating may additionally exhibit photoactivity, such that any dirt or other organic contaminants present on the coating may be structurally degraded when the coating is exposed to ultraviolet radiation, and subsequently washed away by water. Any known self-cleaning coating (for example, titania based, silica based and siloxane based coatings) deposited by any suitable known technique (including sol-gel, spray pyrolysis, magnetron sputtered vacuum deposition and chemical vapour deposition processes) may be used in the present invention. However, a coating comprising only crystalline (anatase) titania appears to be the most effective at the present time.

International patent publication WO 2004/085701 A1 describes the deposition process and properties of a titania coating on a substrate intended for use in the building industry. Much of the teaching therein is applicable to the present invention, so the disclosure of WO '701 is hereby incorporated into this specification by reference. Essentially a self-cleaning coating may be provided on an underlayer, which would be directly deposited onto the outermost surface of the pane of glazing material in question. An underlayer may be especially useful when the self-cleaning coating is deposited on a pane of glass as it may reduce or prevent migration of alkali metal ions from the glass into the coating. The underlayer may be a silicon-based coating, typically silica ($SiO_2$).

The self-cleaning coating may be deposited in a thickness greater than 10 nm, but less than 40 nm, preferably less than 20 nm and most preferably less than 15 nm for it to perform its function most efficiently. The underlayer may be deposited in a similar thickness. The self-cleaning coating may also have a roughness value, Ra, of up to around 5 nm (a high value), preferably around 2 to 3 nm (a low value), but possible less than 2 nm. The lower the roughness value, the more durable the coating is likely to be.

Preferably the self-cleaning coating exhibits between 5 and 20% reflection (when measured normal to the coating), further preferably between 8 and 18% and most preferably between 10 and 15%. Such reflection values mean that the occupants of a vehicle into which such a glazing may be installed may enjoy increased privacy when viewed from outside the vehicle. Furthermore, the reflectivity of the coating may reduce the visibility from outside the vehicle of elements such as busbars associated with the glazing (for example, when providing electrical power to light emitting diodes), the visibility of which is generally undesirable. Moreover, the reflection exhibited by the glazing may be greater when measured "off angle" (i.e. at an angle of incidence to the coating other than the normal), especially at angles of incidence greater than 30°, thereby contributing to the solar control function of the glazing.

A further coating may be provided on the innermost surface of the glazing—this may be a self-cleaning-type coating, for deodorising the environment inside a vehicle when the coating is exposed to ultraviolet radiation, or it may be a low emissivity coating to reduce the amount of heat entering the vehicle (especially useful when one or both of the panes of glazing material are body-tinted glass, which may absorb infrared radiation and subsequently re-radiate the energy). The emissivity of a particular coating refers to the tendency of that coating to radiate energy. Thus a low emissivity coating is a poor thermal radiator (compared to a blackbody entity, which is a perfect radiator and is defined as having an emissivity of unity). A low emissivity coating provided on the innermost surface of the glazing will normally be such that, when applied to 3 mm clear float glass, the coated glass has an emissivity in the range from 0.05 to 0.45; the actual value being measured according to EN 12898 (a published standard of the European Association of Flat Glass Manufacturers). Coatings (when used on 3 mm clear float glass) resulting in an emissivity less than 0.3 are preferred. A hard coating (which when on a pane of glass is typically formed "on-line" by pyrolytically depositing the coating onto a surface of the glass during its formation, in known manner, for example by use of a chemical vapour deposition process) may generally have an emissivity greater than 0.15 (and preferably less than 0.2), whilst an off-line coating (which when on a pane of glass is typically deposited onto the surface of the pane subsequent to complete manufacture of the glass, and is normally a sputtered coating) may generally have an emissivity greater than 0.05 (and preferably less than 0.1). In both cases, the emissivity may be compared with the assumed normal emissivity of clear uncoated glass, which has a value of around 0.89.

The composition of the low emissivity coating may be the same as that described earlier for the solar control coating: essentially either a single layer of an optionally doped metal or metal oxide, or a multilayer stack including at least one metal or metal oxide layer and at least one dielectric layer.

The vehicle glazing of the invention may be in the form of a laminate, having a ply of laminating interlayer material joining the panes of the glazing together. If the glazing includes a functional layer, this may be provided as the ply of laminating interlayer material or it may additionally be laminated into the glazing. In the latter case, the functional layer may be interleaved between two plies of laminating interlayer material to Rhin a composite interlayer. The laminating interlayer material may be any material known in the art that is suitable for forming a laminate. It may be polyvinylbutyral ("PVB"), polyvinyl chloride ("PVC"), polyurethane ("PU") or an ethyl vinyl acetate ("EVA"). It is typically provided in a thickness of between 0.38 and 1.1 mm, but most commonly 0.76 mm. The interlayer material may be clear or body-tinted. It may also be infrared absorbing or reflecting (thereby providing, or at least contributing to, the solar control function of the glazing) and/or it may have sound insulation properties (commonly known as an "acoustic interlayer").

Alternatively, the glazing of the invention may be in the form of a double glazing unit, having a sealed airspace between the two panes of glazing material. The two panes may be spaced apart from one another by spacer elements located along at least two opposing edges of the panes. If the glazing includes a functional layer, this may be located on a surface of one of the panes of glazing material that faces into the airspace. Similarly, a low emissivity coating may be located on a surface that faces into the airspace. A double glazing unit is the most basic form of a multiple glazing unit; the glazing of the invention may comprise three or more panes of glazing material, each spaced apart from one another by a sealed airspace. Furthermore, a multiple pane glazing unit may have one or more of its panes in the form of a laminated glazing. In such a glazing unit, the laminate ply preferably forms the inner ply.

A vehicular glazing according to the invention may be fitted into any window in the bodywork of a vehicle. However, it may be especially used as a roof window.

For a better understanding the present invention will now be more particularly described by way of non-limiting example with reference to, and as shown in, the accompanying schematic drawings wherein.

Figure 1:
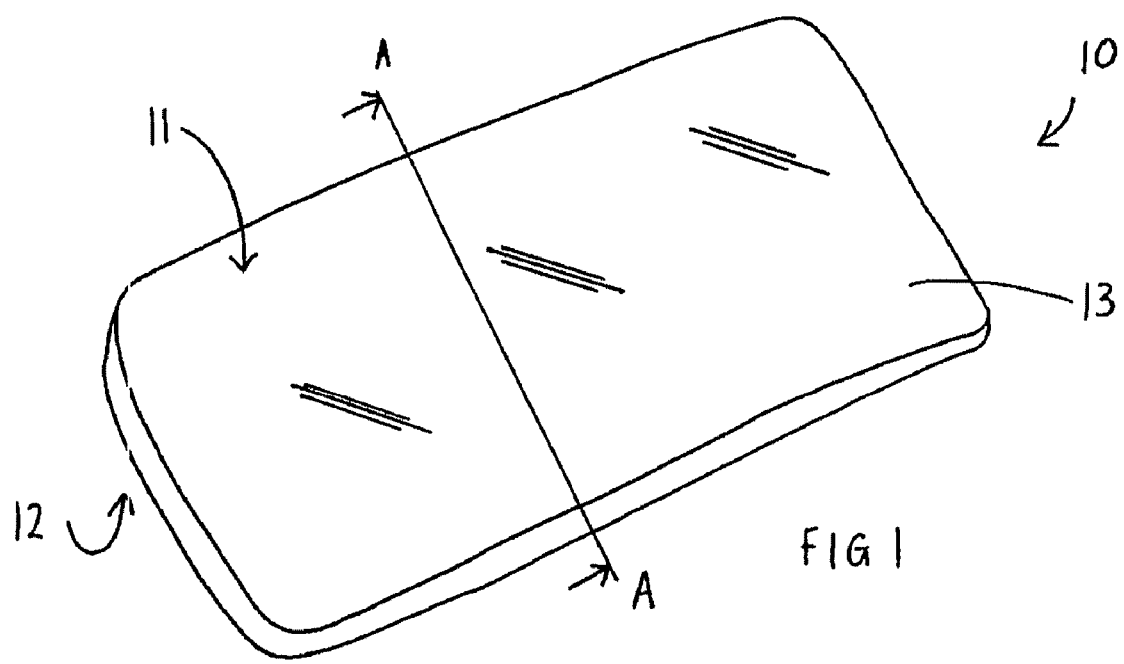
FIG. 1 is a perspective view of a vehicle glazing according to the invention.

Vehicle glazing 10 of FIG. 1 comprises outer pane of glazing material 11 and inner pane of glazing material 12, and is in the form of a roof window. The outermost surface of the glazing (surface 1—the outer surface of outer pane 11) is provided with self-cleaning coating 13. Self-cleaning coating 13 may be deposited directly on outer pane 11, or it may be deposited on an underlayer (not shown) to preserve its self-cleaning integrity, as discussed earlier. Although not shown in FIG. 1, an obscuration band may be provided around the periphery of glazing 10 to disguise and protect the sealant (not shown) that may be used to fix the window into a vehicle (not shown). An obscuration band is usually made from opaque ink that is screen printed onto a surface of one of the panes of glazing material and subsequently fired.

Figure 2:
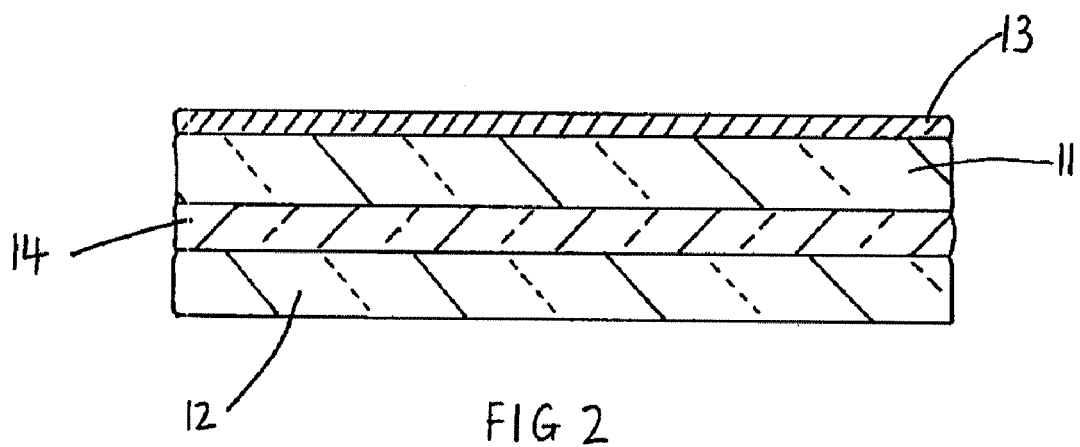
FIG. 2 is a cross section viewed along line A-A of FIG. 1.

FIG. 2 provides more detail about the construction of glazing 10 in that it is a laminate which includes interlayer ply 14 between outer and inner panes of glazing material 11, 12. One or both of the panes of glazing material may be clear glass, having for example a composition ("composition 1") in the range (by weight): $SiO_2$ 68-75%; $Al_2O_3$ 0-5%, $Na_2O$ 10-18%; $K_2O$ 0-5%; MgO 0-10%; CaO 5-15%; $SO_3$ 0-2% along with other optional additives (such as refining aids) in an amount up to 2%. Alternatively one or both of the panes of glazing material may be tinted glass having for example one of the following compositions:

Composition 2

Base glass (by weight): 72.1% $SiO_2$, 1.1% $Al_2O_3$, 13.5% $Na_2O$, 0.6% $K_2O$, 8.5% CaO, 3.9% MgO and 0.2% $SO_3$, and a colourant portion (by weight): 1.45% total iron (calculated as $Fe_2O_3$), 0.30% ferrous oxide (calculated as FeO), 230 ppm $CO_3O_4$, 210 ppm NiO and 19 ppm Se. Such a glass is currently available as GALAXSEE™ from Pilkington Group Limited in the United Kingdom;

Composition 3

Approximately the same base glass as for composition 2, and a colourant portion (by weight): 0.9% total iron (calculated as $Fe_2O_3$) and 0.20% ferrous oxide (calculated as FeO). Such a glass is currently available as OPTIKOOL™ again from Pilkington Group Limited;

Composition 4

Approximately the same base glass as for composition 2, and a colourant portion (by weight): 0.64-0.68% total iron (calculated as $Fe_2O_3$), 0.14-0.17% ferrous oxide (calculated as FeO) and 64-68 ppm $CO_3O_4$. Such a glass is currently available as ARCTIC BLUE™ again from Pilkington Group Limited;

Composition 5

Approximately the same base glass as for composition 2, and a colourant portion (by weight): 0.6% total iron (calculated as $Fe_2O_3$) and 0.14% ferrous oxide (calculated as FeO). Such a light green-tinted glass is currently available from Pilkington Group Limited;

Composition 6

Approximately the same base glass as for composition 2, and a colourant portion (by weight): 0.58% total iron (calculated as $Fe_2O_3$), 0.14% ferrous oxide (calculated as FeO) and 52 ppm $CO_3O_4$. Such a glass is currently available as ARCTIC LITE™ again from Pilkington Group Limited.

In the table of laminated glazing constructions and associated optical properties to follow, where indicated as being present, coating 13 is a 15 nm thick layer of crystalline (anatase) titania on an underlayer of 30 to 40 nm thick silica. Interlayer ply 14 is either a 0.76 mm thick sheet of clear polyvinylbutyral ("PVB") ("interlayer A"), or a 0.76 mm thick sheet of tinted PVB that is colour-matched and transmission-matched to a 4 mm pane of GALAXSEE™ tinted glass ("interlayer B"), or a 0.76 mm thick sheet of tinted, solar absorbing PVB (code: SB47 252100) currently available from Solutia Inc. PO Box 66760, St. Louis, Mo. 63166-6760, USA (www.solutia.com) ("interlayer C"). The optical properties quoted in the table are measured as follows:

$LT_A$ is the visible light transmitted by the glazing measured using CIE Illuminant A over the wavelength range 380 nm to 780 nm at 5 nm intervals;

$RL_A$ is the visible light reflected by the glazing measured using CIE Illuminant A over the wavelength range 380 nm to 780 nm at 5 nm intervals;

TE is the total energy directly transmitted by the glazing measured at Air Mass 1.5 according to the ISO 9050:E (2003) standard;

RE is the total energy directly reflected by the glazing measured at Air Mass 1.5 according to the ISO 9050:E (2003) standard;

TSHT is the total solar heat transmitted by the glazing (i.e. a sum of directly transmitted energy (TE) and energy absorbed by the glazing and subsequently re-radiated) and is calculated using Air Mass 1.5 according to the IS09050:E(2003) standard;

a* and b* are transmitted colour co-ordinates of the glazing according to the CIELAB system, measured using Illuminant D65 at a 2° observer angle.

Each of the examples listed as being without coating 13 is a comparative example to show the additional effects of a self-cleaning coating on the optical properties of glazing 10 as described in the table. It is clear that self-cleaning coating 13 itself possesses solar control properties because those glazings provided with coating 13 exhibit a decrease in TE and TSHT (and increase in RE) compared to those glazings that are not provided with coating 13, thereby increasing passenger comfort inside a vehicle fitted with such glazings. Furthermore, coated glazings reflect more visible light than uncoated glazings, thereby increasing passenger privacy inside the vehicle. A vehicle glazing according to the invention may preferably have an $LT_A$ less than 40%, preferably less than 30% and most preferably in the range from 10 to 20%. It may similarly have a TE less than 35%, preferably less 30% and most preferably in the range from 5 to 25%. It may also exhibit a colour which falls within the ranges a* −1 to −18; b* −16 to +9, preferably a* −2 to −16; b* −10 to +8 and most preferably a* −3 to −14; b* −2 to +7.

| Example | Composition of Outer Pane 11 | Composition of Inner Pane 12 | Interlayer 14 | Coating 13 | $LT_A$ (%) | $RL_A$ (%) | TE (%) | RE (%) | TSHT (%) | a* | b* |
|---|---|---|---|---|---|---|---|---|---|---|---|
| 1 | 3 (2.1 mm) | 5 (2.1 mm) | B | No | 15.9 | 4.4 | 13.5 | 4.4 | 34.7 | −8.8 | 4.4 |
| 2 | 3 (2.1 mm) | 5 (2.1 mm) | B | Yes | 14.9 | 10.5 | 12.8 | 9.8 | 32.8 | −8.5 | 6.2 |
| 3 | 4 (2.1 mm) | 4 (2.1 mm) | B | No | 13.1 | 4.4 | 13.5 | 4.4 | 34.7 | −8.3 | −1.2 |
| 4 | 4 (2.1 mm) | 4 (2.1 mm) | B | Yes | 12.3 | 10.5 | 12.9 | 9.8 | 32.8 | −8.7 | 0.7 |
| 5 | 1 (2.1 mm) | 1 (2.1 mm) | B | No | 19.3 | 4.5 | 27.8 | 4.7 | 45.2 | −4.6 | 4.1 |
| 6 | 1 (2.1 mm) | 1 (2.1 mm) | B | Yes | 18.1 | 10.6 | 26.9 | 10.2 | 43.1 | −4.4 | 6.1 |
| 7 | 4 (3.15 mm) | 1 (2.1 mm) | B | No | 14.3 | 4.4 | 15.5 | 4.4 | 36.2 | −7.7 | 0.0 |
| 8 | 4 (3.15 mm) | 1 (2.1 mm) | B | Yes | 13.4 | 10.5 | 14.9 | 9.9 | 34.3 | −7.6 | 2.0 |
| 9 | 6 (2.1 mm) | 6 (2.1 mm) | B | No | 14.1 | 4.4 | 14.4 | 4.4 | 35.4 | −8.1 | −0.2 |
| 10 | 6 (2.1 mm) | 6 (2.1 mm) | B | Yes | 13.2 | 10.5 | 13.8 | 9.9 | 33.5 | −8.0 | 1.7 |
| 11 | 6 (2.1 mm) | 1 (2.1 mm) | B | No | 16.4 | 4.4 | 19.7 | 4.5 | 39.2 | −6.5 | 1.8 |
| 12 | 6 (2.1 mm) | 1 (2.1 mm) | B | Yes | 15.4 | 10.5 | 18.9 | 9.9 | 37.3 | −6.4 | 3.8 |
| 13 | 6 (2.1 mm) | 5 (2.1 mm) | B | No | 15.3 | 4.4 | 15.1 | 4.4 | 35.9 | −8.0 | 2.0 |
| 14 | 6 (2.1 mm) | 5 (2.1 mm) | B | Yes | 14.4 | 10.5 | 14.4 | 9.9 | 34.0 | −7.9 | 3.9 |
| 15 | 6 (2.1 mm) | 3 (1.6 mm) | B | No | 14.9 | 4.4 | 14.1 | 4.4 | 35.2 | −8.3 | 2.0 |
| 16 | 6 (2.1 mm) | 3 (1.6 mm) | B | Yes | 14.0 | 10.5 | 13.5 | 9.8 | 33.3 | −8.2 | 4.0 |
| 17 | 2 (2.1 mm) | 2 (2.1 mm) | A | No | 16.4 | 4.4 | 13.4 | 4.4 | 34.6 | −4.2 | 2.7 |
| 18 | 2 (2.1 mm) | 2 (2.1 mm) | A | Yes | 15.4 | 10.5 | 12.8 | 9.8 | 32.7 | −4.3 | 4.7 |
| 19 | 1 (2.1 mm) | 1 (2.1 mm) | C | No | 20.2 | 4.5 | 13.2 | 4.4 | 34.5 | −10.4 | 0.9 |
| 20 | 1 (2.1 mm) | 1 (2.1 mm) | C | Yes | 18.9 | 10.6 | 12.5 | 9.9 | 32.6 | −10.4 | 3.1 |
| 21 | 3 (2.1 mm) | 3 (1.6 mm) | C | No | 16.5 | 4.4 | 8.6 | 4.3 | 31.1 | −13.5 | 1.7 |
| 22 | 3 (2.1 mm) | 3 (1.6 mm) | C | Yes | 15.5 | 10.5 | 8.1 | 9.8 | 29.3 | −13.4 | 3.7 |

Figure 3:
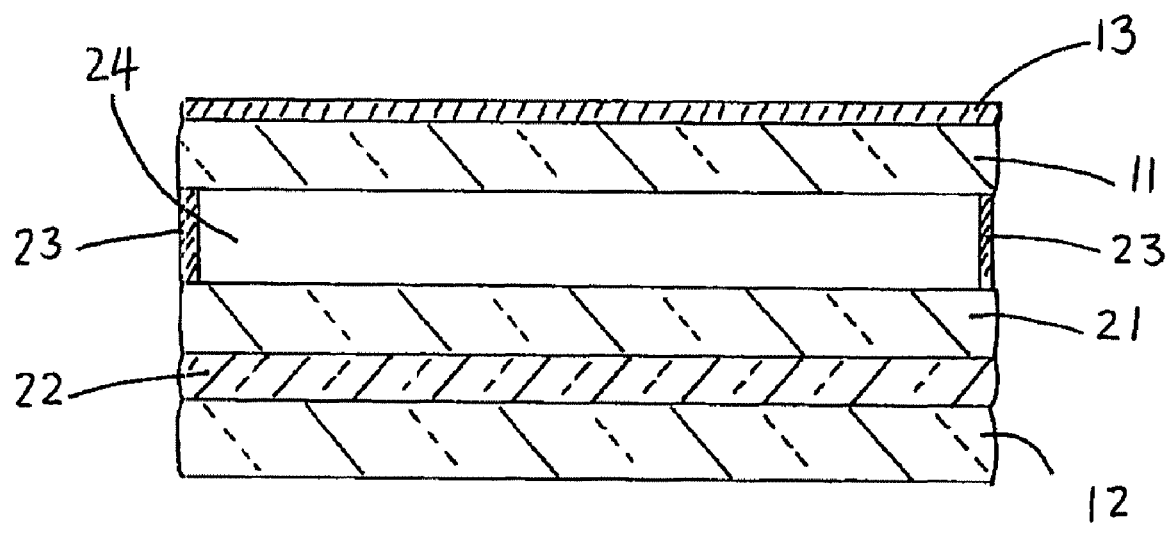
FIG. 3 is a cross section viewed along line A-A of an alternative construction of the glazing in FIG. 1.

The construction of glazing 10 shown in FIG. 3 is that of a laminate which includes a double glazing unit as one of its plies (in this case, the outer ply). The double glazing unit comprises outer pane of glazing material 11, middle pane of glazing material 21, spacers 23 which maintain panes of glazing material 11, 21 spaced apart from one another and low emissivity coating 25 on the inner surface of middle pane 21 (i.e. on surface 3 of the glazing). Spacers 23 are used to seal the airspace 24 between panes 11, 21. Instead of filling airspace 24 with air, it may be filled with any other gas, preferably an inert gas that provides the glazing with good thermal insulation properties.

The double glazing unit is joined to inner pane of glazing material 12 by an interlayer ply 22 to form a laminate. The composition of the panes of glazing material 11, 12, 21 may be chosen from compositions 1 to 6 described above in relation to FIG. 2.

For the glazings depicted, each may also include a functional layer within its construct and/or a self-cleaning-type coating or a low emissivity coating on its innermost surface, as described above.

The invention claimed is:

1. A vehicle glazing comprising:
   two panes of glazing material spaced apart from one another;
   a hydrophilic, photoactive, self-cleaning coating, comprising crystalline titania, extending over the outermost surface of the glazing;
   a functional layer extending between the two panes of glazing material;
   wherein the self-cleaning coating is deposited in a thickness of between 10 nm and 40 nm, and exhibits between 5% and 20% reflection (when measured normal to the coating), and the functional layer comprises a ply of polymeric material that is provided on one of its surfaces with a silver-based solar control coating; and
   wherein the functional layer further comprises one or more light emitting diodes.

2. A vehicle glazing as claimed in claim 1, wherein at least one of the panes of glazing material is body-tinted glass, the composition of which includes one or more of the following colourants: iron oxide, cobalt oxide, selenium, chromium oxide, titanium oxide, manganese oxide, copper oxide, vanadium oxide, nickel oxide.

3. A vehicle glazing as claimed in claim 2, wherein iron oxide (as total iron expressed as Fe2O3) is included in an amount from 0.01 to 3.0% by weight of the glass.

4. A vehicle glazing as claimed in claim 1, wherein at least one of the panes of glazing material is provided on an inner surface with a solar control coating.

5. A vehicle glazing as claimed in claim 1, wherein each pane of glazing material has a thickness in the range from 0.5 to 25 mm.

6. A vehicle glazing as claimed in claim 5, wherein the overall thickness of the glazing is in the range from 1.5 to 100 mm.

7. A vehicle glazing as claimed in claim 1, wherein a self-cleaning-type coating is provided on the innermost surface of the glazing.

8. A vehicle glazing as claimed in claim 1, wherein a low emissivity coating is provided on the innermost surface of the glazing.

9. A vehicle glazing as claimed in claim 1, wherein the one or more light emitting diodes are provided on an electrically conductive substrate.

10. A vehicle glazing as claimed in claim 1, wherein the functional layer further comprises a visible light attenuation material.

11. A vehicle glazing as claimed in claim 10, wherein the visible light attenuation material is selected from the group of materials consisting of a liquid crystal film, an electrochromic layer and a suspended particle device.

12. A vehicle glazing as claimed in claim 10, wherein the visible light attenuation material is a liquid crystal film.

13. A vehicle glazing as claimed in claim 10, wherein the visible light attenuation material is an electrochromic layer.

14. A vehicle glazing as claimed in claim 10, wherein the visible light attenuation material is a suspended particle device.

15. A vehicle glazing as claimed in claim 1, in the form of a laminate having a ply of laminating interlayer material joining the panes of the glazing together.

16. A vehicle glazing as claimed in claim 15, wherein the ply of laminating interlayer material either absorbs or reflects infrared radiation.

17. A vehicle glazing as claimed in claim 1, in the form of a double glazing unit having a sealed airspace between the two panes of glazing material.

18. A vehicle glazing as claimed in claim 1, wherein the vehicle glazing is a roof window.

* * * * *